United States Patent
Ji et al.

(10) Patent No.: US 11,031,010 B2
(45) Date of Patent: Jun. 8, 2021

(54) SPEECH RECOGNITION SYSTEM PROVIDING SECLUSION FOR PRIVATE SPEECH TRANSCRIPTION AND PRIVATE DATA RETRIEVAL

(71) Applicant: MOTOROLA MOBILITY LLC, Chicago, IL (US)

(72) Inventors: Zhengping Ji, Hinsdale, IL (US); Rachid Alameh, Crystal Lake, IL (US); Yi Wu, Chicago, IL (US); Robert S. Witte, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 166 days.

(21) Appl. No.: 16/502,883

(22) Filed: Jul. 3, 2019

(65) Prior Publication Data
US 2021/0005190 A1    Jan. 7, 2021

(51) Int. Cl.
*G10L 15/22* (2006.01)
*G10L 15/30* (2013.01)
*G06F 3/16* (2006.01)
*G10L 15/18* (2013.01)
*G10L 17/00* (2013.01)

(52) U.S. Cl.
CPC .............. *G10L 15/22* (2013.01); *G06F 3/167* (2013.01); *G10L 15/1815* (2013.01); *G10L 15/30* (2013.01); *G10L 17/00* (2013.01); *G10L 2015/223* (2013.01); *G10L 2015/227* (2013.01)

(58) Field of Classification Search
CPC ......... G10L 15/30; G10L 17/00; G10L 17/22; G10L 15/22–15/228; G10L 15/1815; G06F 40/00–40/58; G06F 16/90332; G06N 3/006; G06N 5/025
See application file for complete search history.

(56) References Cited

U.S. PATENT DOCUMENTS

| 2008/0172233 | A1* | 7/2008 | Smaragdis | ............... H04K 1/00 704/256 |
| 2019/0348041 | A1* | 11/2019 | Cella | ...................... G06F 40/284 |
| 2019/0348066 | A1* | 11/2019 | Funakoshi | .............. G10L 21/06 |
| 2020/0043498 | A1* | 2/2020 | Chae | ....................... G10L 15/26 |

* cited by examiner

*Primary Examiner* — Abul K Azad
(74) *Attorney, Agent, or Firm* — Isidore PLLC

(57) ABSTRACT

A method includes receiving a voice input via a microphone of an electronic device, and determining whether the voice input contains speech from an authorized user of the electronic device or speech from an unauthorized user. The method includes in response to determining that the voice input contains speech from the authorized user: determining whether the speech contains private speech or public speech; in response to determining that the speech contains private speech, processing the voice input through a local automatic speech recognition (ASR) engine within the electronic device, the local ASR engine converting the voice input from audio format to text format and outputting a text transcription of the private speech; and in response to determining that the speech does not contain private speech, forwarding the voice input through a communication interface associated with a network-connected external device for processing the voice input at the network-connected external device.

15 Claims, 7 Drawing Sheets

SPEECH RECOGNITION SYSTEM PROVIDING SECLUSION FOR PRIVATE SPEECH TRANSCRIPTION AND PRIVATE DATA RETRIEVAL

BACKGROUND

1. Technical Field

The present disclosure generally relates to electronic devices with voice signal processing, and more particularly to voice signal processing within automatic speech recognition (ASR) systems within electronic devices.

2. Description of the Related Art

User devices, such as mobile phones, are increasingly relying on cloud-based automatic speech recognition (ASR) systems to accurately transcribe the speech of a voice audio signal into text. The cloud-based ASR system, which is stored on and runs on a remote server connected to a communications network (e.g., the Internet), has ample resources to store the model size and run the model for speech-to-text conversion. In contrast, both the cloud-based ASR model size and the resources (e.g., processor capacity, memory, power, etc.) needed to run the model are usually beyond the capability of user devices, such as smartphones, laptops, tablets, and other mobile devices. Although the cloud-based ASR system has ample resources, there are concerns about invasions of privacy when a person's private speech content is transmitted to or processed by a cloud-based ASR system. Thus, there is a preference for the ASR system to instead be stored and run on the end user device. Due to the limitations of resources within end user devices, particularly within wearable devices having a smaller form factor, a less resource intensive ASR system designed for use within the end user devices achieves lower transcription accuracy than a cloud-based ASR system.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
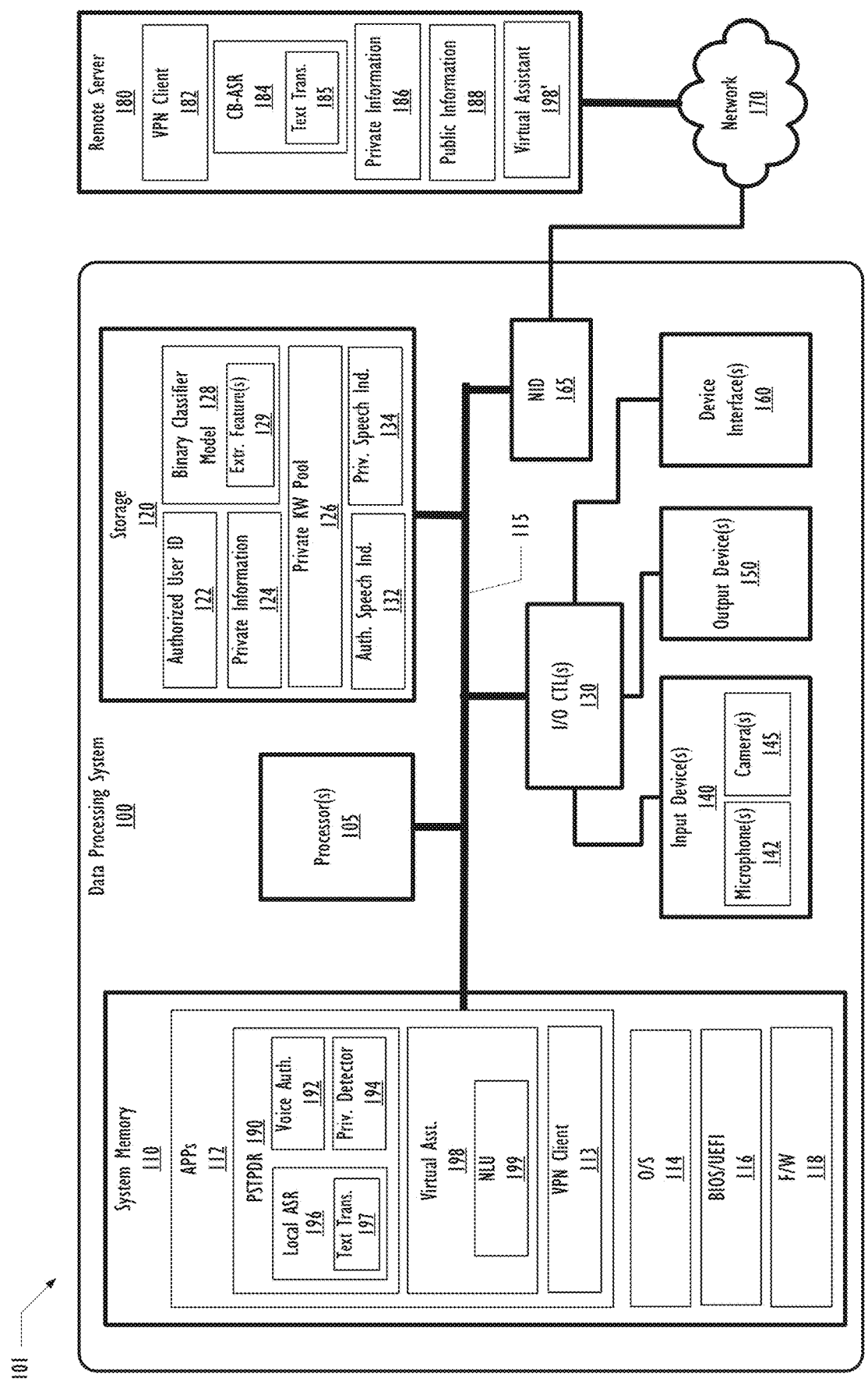
FIG. 1 is a block diagram representation of an example data processing system within which certain aspects of the disclosure can be practiced, in accordance with one or more embodiments of this disclosure.

Disclosed are a method, an electronic device, and a computer program product for operating a private speech transcription and private data retrieval (PSTPDR) system that selectively routes audio to a cloud-based automatic speech recognition (ASR) system or to a local ASR engine based on user identification (ID) and speech content, to provide seclusion (namely, privacy). The method includes receiving a voice input via a microphone of an electronic device. The method includes determining whether the voice input contains speech from an authorized user of the electronic device or speech from an unauthorized user. The method includes, in response to determining that the voice input contains speech from the authorized user, determining whether the speech contains private speech or public speech. The method includes, in response to determining that the speech from the authorized user contains private speech, processing the voice input through a local ASR engine within the electronic device. The local ASR engine converts the voice input from audio format to text format and outputs a text transcription of the private speech. The method includes, in response to determining that the speech from the authorized user does not contain private speech, forwarding the voice input through a communication interface associated with a network-connected external device for processing the voice input at the network-connected external device.

According to one aspect, the method also includes, analyzing the text transcription from the local ASR engine to determine whether the text transcription contains a request for private information. The method includes in response to determining that the text transcription contains a request for private information, determining whether the private information is available only via the network-connected external device. The method includes in response to determining that the private information is available only via the network-connected external device, establishing a virtual private network (VPN) through which to transmit the request for private information to the network-connected external device in order for an electronic device of a user to securely receive the private information from the external device.

According to another embodiment, an electronic device includes at least one microphone that receives a voice input. The electronic device includes a communication interface that enables communication, via a network, to a network-connected external device. The electronic device includes a memory storing a PSTPDR module. The PSTPDR module configures the electronic device to process the voice input through a selected one of a local processing path within the electronic device and a network-based processing path using a network-connected external device. The selected processing path is selected in part based on whether the voice input contains speech from an authorized user or speech from an unauthorized user. The electronic device also includes a processor and an output device. The processor is operably coupled to the at least one microphone, the communication interface, the memory, and the output device. The processor executes the PSTPDR module, which enables the electronic device to determine whether the voice input contains speech from the authorized user of the electronic device. The electronic device, in response to determining that the voice input contains speech from the authorized user: determines whether the speech contains private speech or public speech. The electronic device, in response to determining that the speech contains private speech, processes the voice input through a local automatic speech recognition (ASR) engine. The local ASR converts the voice input from audio format to text format and outputs a text transcription of the private speech. The electronic device, in response to determining that the speech does not contain private speech, forwards the voice input through the communication interface associated with the network-connected external device for processing the voice input at the network-connected external device. The local ASR engine within the electronic device is thus able to transcribe a voice input with a transcription accuracy that enables a natural language understanding (NLU) system to determine user intent, which enables the mobile device to determine whether the private information requested within the private speech is available only via the network-connected external device.

In the following description, specific example embodiments in which the disclosure may be practiced are described in sufficient detail to enable those skilled in the art to practice the disclosed embodiments. For example, specific details such as specific method sequences, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of a data processing device, specifically data processing system (DPS) 100, within which one or more of the described features of the various embodiments of the disclosure can be implemented. DPS 100 may be a handheld device, personal computer, a server, a network storage device, or any other suitable device, and may vary in size, shape, performance, functionality, and price. Within communication system 101, DPS 100 can communicate with remote server 180 and other external devices via network 170.

Example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data.

As shown, system memory 110 can include therein a plurality of software and/or firmware modules including application(s) 112, operating system (O/S) 114, a virtual private network (VPN) client module 113, basic input/output system/unified extensible firmware interface (BIOS/UEFI) 116, and other firmware (F/W) 118. As described more particularly below, applications 112 include private speech transcription and private data retrieval (PSTPDR) module 190. PSTPDR module 190 may be referred to as simply PSTPDR 190.

In some embodiments, storage 120 can be a hard drive or a solid-state drive. The one or more software and/or firmware modules within storage 120 can be loaded into system memory 110 during operation of DPS 100. The various software and/or firmware modules have varying functionality when their corresponding program code is executed by processor(s) 105 or other processing devices within DPS 100.

DPS 100 further includes one or more input/output (I/O) controllers 130, which support connection by, and processing of signals from, one or more connected input device(s) 140, such as a keyboard, mouse, touch screen, sensors. As examples of sensors, the illustrative embodiment provides microphone 142 and camera 145. Microphone 142 detects sounds, including oral speech of a user and other sounds, in the form of sound waves. Camera 145 captures video image data, such as a video of the face or mouth of the user while microphone 142 is receiving voice input. I/O controllers 130 also support connection to and forwarding of output signals to one or more connected output devices 150, such as a display, or audio speaker(s). Additionally, in one or more embodiments, one or more device interface(s) 160, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. Device interface(s) 160 can be utilized to enable data to be read from or stored to additional devices (not shown) for example a compact disk (CD), digital video disk (DVD), flash drive, or flash memory card. These devices can collectively be referred to as removable storage devices and are examples of non-transitory computer readable storage media. In one or more embodiments, device interface(s) 160 can further include General Purpose I/O interfaces, such as an Inter-Integrated Circuit (I²C) Bus, System Management Bus (SMBus), and peripheral component interconnect (PCI) buses.

DPS 100 further comprises a network interface device (NID) 165. NID 165 enables DPS 100 to communicate and/or interface with other devices, services, and components that are located external (remote) to DPS 100, for example, remote server 180, via a communication network. These devices, services, and components can interface with DPS 100 via an external network, such as example network 170, using one or more communication protocols. Network 170 can be a local area network, wide area network, personal area network, signal communication network, and the like, and the connection to and/or between network 170 and DPS 100 can be wired or wireless or a combination thereof. For simplicity and ease of illustration, network 170 is indicated as a single block instead of a multitude of collective components. However, it is appreciated that network 170 can comprise one or more direct connections to other devices as well as a more complex set of interconnections as can exist within a wide area network, such as the Internet. In at least one embodiment, network 170 includes a virtual private network (VPN) server that provides VPN services to DPS 100 and remote server 180 and enables secure communications between VPN client module 113 of DPS 100 and VPN client 182 of remote server 180. Remote server 180 includes VPN client 182, cloud-based ASR engine 184 (illustrated as CB-ASR) that generates text transcription 185, remote private information 186, public information 188, and remote virtual assistant 198'. The specific functionality of each of these components or modules within remote server 180 are described more particularly below.

As introduced above, DPS 100 also includes PSTPDR 190. Within this embodiment, processor 105 executes PSTPDR 190 to provide the various methods and functions described herein. For simplicity, PSTPDR 190 is illustrated and described as a stand-alone or separate software/firmware/logic component, which provides the specific functions and methods described herein. More particularly, to provide seclusion, PSTPDR 190 implements an PSTPDR process (such as process 600 of FIG. 6) to selectively route audio voice input to either cloud-based ASR engine 184 or local ASR engine 196, based on speech content and identification of a user as being an authorized user or an unauthorized user, in accordance with one or more embodiments of this disclosure. However, in at least one embodiment, PSTPDR 190 may be a component of, may be combined with, or may be incorporated within OS 114, and/or with one or more applications 112. Additional aspects of PSTPDR 190, and functionality thereof, are presented within the description of FIGS. 2-6.

Figure 3:
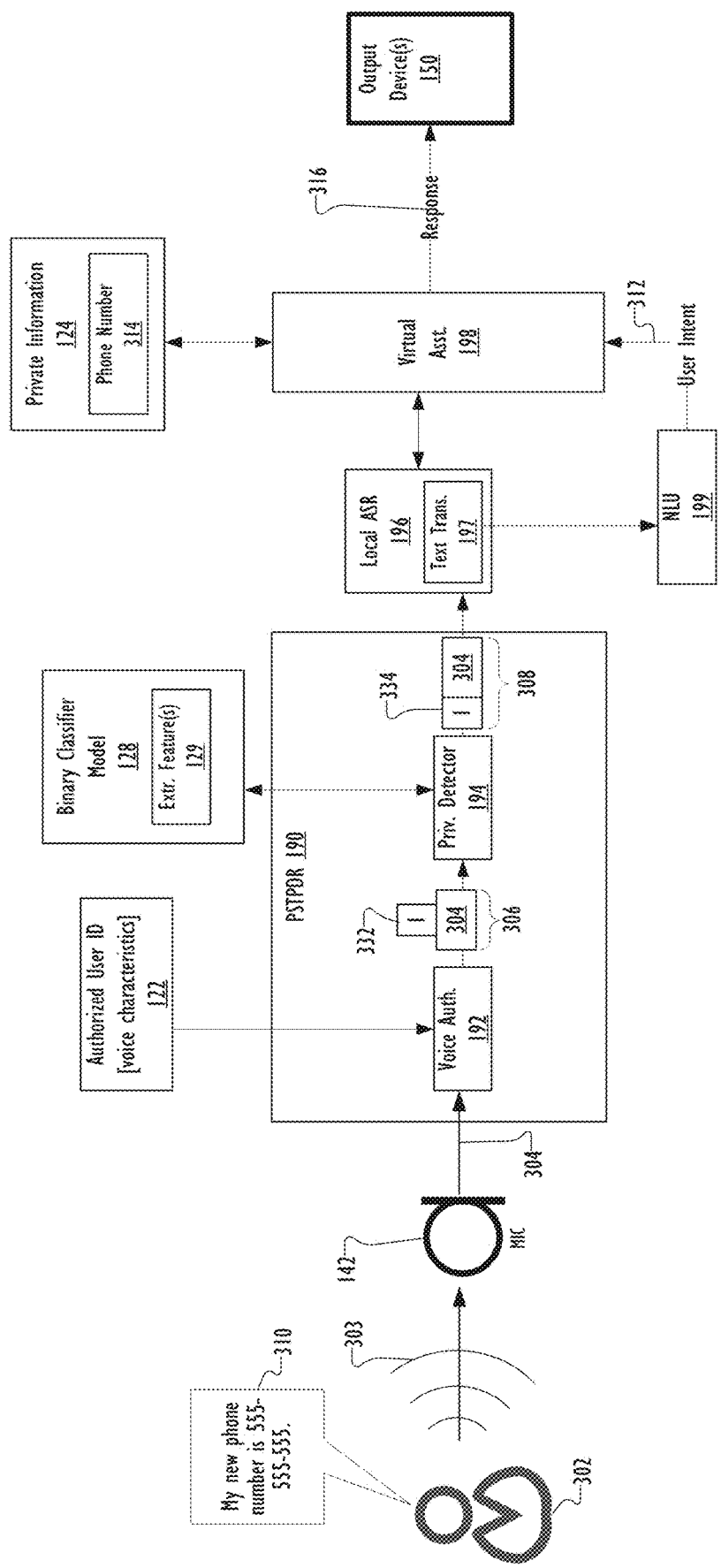
FIG. 3 illustrates components of the data processing system of FIG. 1 processing an example voice input through a local processing path within the data processing system of FIG. 1, in accordance with one or more embodiments.
Figure 4:
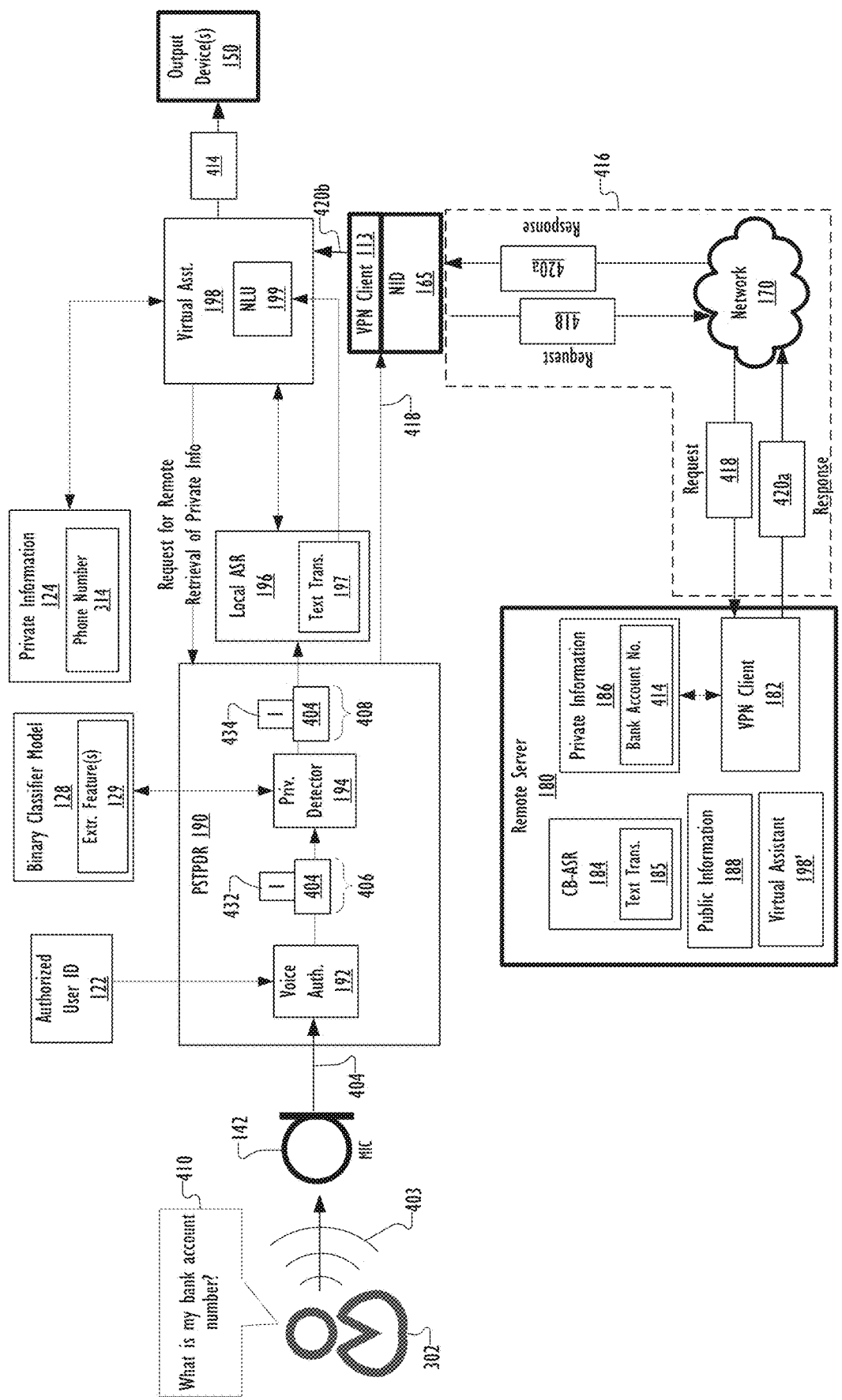
FIG. 4 illustrates an example of remote processing of a voice input through a network-based processing path using a network-connected external device, in accordance with one or more embodiments.

PSTPDR 190 includes a voice authenticator 192, a privacy detector 194, and a local ASR engine 196. In the illustrated embodiment, local ASR engine 196 is presented as being included within the PSTPDR 190. However, it is understood that in other embodiments, local ASR engine 196 can be a separate module within applications 112. That is, PSTPDR 190 can reference the separate module of local ASR engine 196 (as shown in FIGS. 3-5). PSTPDR 190 receives voice input from microphone 142, for example, when a user speaks aloud to DPS 100 in order for a virtual assistant 198 to perform a requested task. Virtual assistant 198 is a software application(s) that understands natural language (e.g., using an NLU system 199) within text transcription 197 and completes electronic tasks in response to user inputs or based on the text transcription 197. Virtual assistant 198 includes NLU system 199. NLU system 199 may be referred to as simply NLU 199. NLU 199 enables machines to comprehend what a body of text really means. Within DPS 100, NLU 199 receives text transcription 197 from local ASR engine 196. NLU 199 determines the user intent from text transcription 197. For example, in response to receiving "I prefer sushi over pizza" as text transcription 197, NLU 199 determines the user intent of updating personal preferences within private information 124. Virtual assistant 198 obtains the user intent from NLU system 199. For example, virtual assistant 198 can use text transcription 197 to take dictation, read a text message or an e-mail message, look up phone numbers, place calls, generate reminders, and retrieve information requested by the user.

Voice authenticator 192 determines whether the voice input received via microphone 142 contains speech from a specific authorized user of the DPS 100. As an example, voice authenticator 192 can prompt the user to provide user input that matches a registered authorized user ID 122 (e.g., a previously registered voice ID, as described in further details below), and determine that a voice input is from the specific authorized user of DPS 100 if DPS 100 receives the user input matching the authorized user ID 122 during a predetermined period of time after the prompt is provided. In order to prevent a mischievous person from gaining access to private information 124 by playing a recording of the voice of an authorized user into microphone 142, voice authenticator 192, in some embodiments, enhance the determination that the user input matches the authorized user ID 122 by obtaining face ID (e.g., a previously registered face ID) recognition information from camera 145. The face ID recognition can verify that the audio voice input received via microphone 142 is coming from a person currently speaking (e.g., moving his/her lips) within view of camera 145. It is understood that voice authenticator 192 can use various methods for determining whether the voice input received via microphone 142 contains speech from an authorized user of the DPS 100, and that this disclosure does not include an exhaustive list of such methods. When voice authenticator 192 determines that the voice input contains speech from an unauthorized user, PSTPDR 190 selects a network-based processing path to process the voice input using a network-connected external device, such as remote server 180. When voice authenticator 192 determines that the voice input contains speech from an authorized user of DPS 100, PSTPDR 190 selects a local processing path to process the voice input within the electronic device.

Voice authenticator 192, in response to determining that the voice input contains speech from an authorized user, sets an authorized speech indicator 132 (illustrated as Auth. Speech Ind.) to a value of 1 (or 0) to indicate that the voice input received via microphone 142 contains speech from an authorized user of the DPS 100. In the embodiment shown in FIG. 1, authorized speech indicator 132 is stored in storage 120. In at least one embodiment, voice authenticator 192 generates an output signal that carries authorized speech indicator 132 to privacy detector 194, NID 165, and other components within DPS 100. In at least one embodiment, authorized speech indicator 132 is stored as metadata associated with the voice input. For example, metadata can be a value (e.g., 1 or 0) embedded within a header of a signal that carries the voice input. The term "header" refers to supplemental data placed at the beginning of a block of data being stored or transmitted. As another example, metadata can be a tag attached to the voice input or a tag attached to a signal that carries the voice input. Voice authenticator 192, in response to determining that the voice input contains speech from an unauthorized user, sets authorized speech indicator 132 to a value of 0 (or 1) to indicate that the voice input received via microphone 142 contains speech from an unauthorized user. By accessing authorized speech indicator 132 from storage 120 or receiving the output signal carrying authorized speech indicator 132, other components within DPS 100 (e.g., privacy detector 194 and NID 165) can detect that PSTPDR 190 has selected the network-based processing path to process the voice input using a network-connected external device, based on authorized speech indicator 132 being set to the value of 0.

The local processing path within DPS 100 includes privacy detector 194 and local ASR engine 196. Privacy detector 194 determines whether the speech from the authorized user of the DPS 100 contains private speech or speech that is not private (herein referred to as "public speech"). When voice input from an authorized user of the DPS 100 contains private speech, local ASR engine 196 generates a text transcription 197 of the private speech by converting the private speech from audio format to text format. In completing the conversion, local ASR engine 196 utilizes a local ASR model (namely, an acoustic model and a language model), which, in some embodiments, the model occupies a memory footprint ranging from tens of megabytes (MB) to hundreds of megabytes (GB) in size. Locally within DPS 100, virtual assistant 198 uses text transcription 197 to perform secondary functions (e.g., understanding natural language within text transcription 197 and completing electronic tasks based on the text transcription 197).

The network-based processing path includes a communication interface, such as ND 165, that is communicatively connected, via network 170, to a network-connected external device, such as remote server 180. The network-based processing path is utilized for processing the voice input (transmitted via ND 165 and network 170 and received at remote server 180, as described in more detail below with reference to FIGS. 5A and 5B) at the network-connected external device. More particularly, in one embodiment, the voice input received at the network-connected external device can be the original audio data captured by microphone 142. In another embodiment, the voice input received at the network-connected external device can be a data signal representing the original audio data captured by microphone 142, which has been pre-processed at the local device to identify whether ASR processes will be performed by local ASR engine 196 or by cloud-based ASR engine 184. Within the network-based processing path, DPS 100 forwards the voice input to network-connected external device and triggers (via transmission of a request) cloud-based ASR engine 184 of the network-connected device to perform ASR processes on the voice input. For example, in one embodiment, DPS 100 can trigger cloud-based ASR engine 184 to perform ASR processes on the voice input by sending the voice input to cloud-based ASR engine 184. In response to being triggered to perform ASR processes on the voice input, cloud-based ASR engine 184 completes conversion of the voice input from audio format to text format and generates a text transcription 185 of the voice input. More particularly, in completing the conversion, cloud-based ASR engine 184 utilizes a cloud-based ASR model (namely, an acoustic model and a language model) that occupies a memory footprint that can be a few hundreds of gigabytes (GB) in size, in some cases. The remote server 180 can include remote virtual assistant 198' that performs similar functions as virtual assistant 198. For example, remote virtual assistant 198' understands natural language within text transcription 185 and performs secondary functions (e.g., retrieve and send public information 188 to DPS 100) based on text transcription 185.

In at least one embodiment, storage 120 of DPS 100 stores private information 124 associated with each respective authorized user of DPS 100. Private information 124 can include a phone number, a password, bank account number, vehicle license plate number, social security number, driver license number, government-issued ID number, personal preference(s), or other personal information. An example personal preference is "I prefer sushi over pizza." With this example, the words "I prefer" serve as a trigger phrase that identifies a personal preference that can be considered private information 124.

In at least one embodiment, storage 120 of DPS 100 stores a natural language understanding (NLU) system, similar to NLU 199. Within storage 120, the NLU system includes program code that is executed by processor 105. Although depicted as being incorporated within virtual assistant 198, in at least one embodiment, NLU 199 may be stored separately from applications 112, yet implemented as an application. Processor 105 loads and executes program code stored in system storage 120. An example of program code that may be loaded and executed by processor 105 includes program code associated with NLU 199.

In at least one embodiment, storage 120 of DPS 100 stores a binary classifier model 128. Privacy detector 194 determines whether the speech from the authorized user contains private speech or public speech by accessing storage 120 and using binary classifier model 128. Privacy detector 194 performs a feature extraction process(es) on the waveform of the voice input, loads the extracted feature(s) 129 (illustrated as Extr. Feature(s)) into the binary classifier model 128, and then runs the feature-loaded binary classifier model 128. Privacy detector 194 uses the results of running the feature-loaded binary classifier model 128 to determine whether the voice input is public speech or private speech. The result of running the feature-loaded binary classifier model 128 may be referred to as simply "classifier result." More particularly, the classifier result includes either a probabilistic value between zero (0) and one (1) or another type of predictive classification value between negative one (−1) and positive one (+1). Privacy detector 194 determines either that the classifier result is within a range of values associated with private speech or that the classifier result is within a range of values associated with public speech. In embodiments in which the classifier result is a probabilistic value, privacy detector 194 ascertains that the voice input is private speech when the result is equal to or greater than 0.5, but ascertains that the voice input is public speech when the result is less than 0.5. In an alternative embodiment in which the classifier result is another type of predictive classification value, privacy detector 194 ascertains that the voice input is private speech when the result is equal to or greater than zero (0), but ascertains that the voice input is public speech when the result is less than zero (0). As described more particularly below, privacy detector 194 flags the voice input as "private," when the determination is the voice input as private speech. Privacy detector 194 flags the voice input as "public" when the determination is that the voice input is the public speech.

In this disclosure, "features" refers to neural network connection weights, number of layers in a neural network, number of nodes in each layer of the neural network, and the node thresholds for each node. A neural network is a way to organize features for better understanding of an audio utterance (e.g., audio frame, or audio content). For example, acoustic-type features can be used to make speech/non-speech decisions about the audio utterance. As another example, features can be used to detect whether any words within a predefined set of words associated with private speech was spoken within a voice input. Features can be arranged in a hierarchical order. For example, features can be arranged in layers within a neural network.

In at least one other embodiment, privacy detector 194 determines whether the speech from the authorized user contains private speech by implementing a keyword-spotting methodology. Keyword spotting is a method used to detect the presence (or absence) of predefined words in (oral or written) speech. Keyword-spotting is not designed to detect every word in a speech, in comparison to ASR engines (such as local ASR engine 196 and cloud-based ASR engine 184) that are used to recognize every word in the speech. As an example, privacy detector 194 can use the keyword-spotting methodology described in an article authored by Guoguo Chen et al., published by the Institute of Electrical and Electronics Engineers (IEEE), titled "Small-footprint keyword spotting using deep neural networks", which document is hereby incorporated by reference in its entirety. It is understood that other keyword-spotting methodologies may be used without departing from the scope of this disclosure. In this disclosure, private keyword pool 126 stores the predefined set of words associated with private speech. For example, the predefined set of words associated with private speech can include words or phrases such as "phone number," "password," "bank account," "license," "prefer," "social security," etc. Privacy detector 194 detects the presence (or absence) of a word(s) stored in private keyword pool 126 (illustrated as private KW pool) by implementing the keyword-spotting methodology on a voice input (e.g., audio voice input 304 of FIG. 3) from the authorized user. Private keyword pool 126 may be stored in storage 120, in at least one embodiment.

Privacy detector 194, in the process of flagging the voice input as "private" or "public," sets a value of a private speech indicator 134 (illustrated as "Priv. Speech Ind."). More particularly, when privacy detector 194 determines that the voice input is private speech, privacy detector 194 sets private speech indicator 134 to a value of 1 (or 0) to indicate that the voice input contains private speech. In this disclosure, setting private speech indicator 134 to a value of 1 to indicate that the voice input contains private speech is also referred to as applying a "private flag" to the voice input. In the embodiment shown in FIG. 1, authorized speech indicator 134 is stored in storage 120. In at least one embodiment, privacy detector 194 generates an output signal that carries authorized speech indicator 134 to other components within DPS 100, such as local ASR engine 196, virtual assistant 198, or NID 165. In at least one embodiment, private speech indicator 134 is stored as metadata associated with the voice input. When privacy detector 194 determines that the voice input is public speech, privacy detector 194 sets private speech indicator 134 to a value of 0 (or 1) to indicate that the voice input contains public speech. In this disclosure, setting private speech indicator 134 to a value of 0 to indicate that the voice input contains public speech is also referred to as applying a "public flag" to the voice input. By accessing private speech indicator 134 from storage 120 or receiving the output signal carrying private speech indicator 134, other components within DPS 100 (e.g., local ASR engine 196, virtual assistant 198, and NID 165) can detect that PSTPDR 190 has selected the local processing path to process the voice input within the electronic device (based on private speech indicator 134 being set to the value of 1) or has selected the network-based processing path to process the voice input using a network-connected external device (based on private speech indicator 134 being set to the value of 0).

In some instances, a user may speak aloud to DPS 100 in order to request virtual assistant 198 to perform a task of retrieving private information 124. Privacy detector 194 (using binary classifier model 128) will apply a private flag to voice input received by DPS 100 when the voice input contains private speech (e.g., words from the predefined set of words associated with private speech, which may be stored in private keyword pool 126). As examples of the operation of privacy detector 194, a private flag may be applied to voice input that contains each of the following examples of private speech spoken by an authorized user: "My new phone number is 555-555-555;" "I prefer sushi over pizza;" "phone number;" "password;" bank account;" "license plate number;" and "my bank account number is 555-555-555." It is understood that this disclosure does not contain an exhaustive list of every private speech. In some instances, the private information requested by the authorized user is stored locally within DPS 100 as private information 124. In such instances, DPS 100 will perform the task of retrieving private information 124 from storage 120 within DPS 100. In order to provide a response to a user request contained in the user input, output device(s) 150 of DPS 100 provides (e.g., displays or narrates) the private information 124 to the user via a display or speakers.

In other instances, the private information requested by the authorized user is not available locally within DPS 100, but instead is stored as remote private information 186 within a network-connected external device, such as remote server 180, and is available only via the network-connected external device. In such other instances, DPS 100 will perform the task of retrieving remote private information 186 from remote storage associated with remote server 180. Particularly, DPS 100 will use VPN client module 113 to establish a virtual private network (VPN) through which to transmit the request for private information to the network-connected external device (i.e., remote server 180) in order to securely receive the private information from the external device. VPN client module 113 enables DPS 100 to: (i) generate a request to retrieve remote private information 186 and/or public information 188 from remote server 180; (ii) encrypt the request according to a VPN security protocol for traffic within an encrypted communication tunnel; (iii) transmit encrypted requests to remote server 180 via the encrypted communication tunnel; (iv) receive encrypted responses from remote server 180 via the encrypted communication tunnel; and (v) decrypt the encrypted responses. In some embodiments, VPN client module 113 includes an encryption-decryption engine that is incorporated as a module within VPN client 113. In at least one alternate embodiment, the encryption-decryption engine can be a separate module that is utilized by VPN client 113 to encrypt and decrypt data. DPS 100 establishes a VPN encrypted communication tunnel with remote server 180. More particularly, VPN client 113 within DPS 100 collaborates with VPN client 182 within remote server 180 to establish the encrypted communication tunnel through network 170. The encrypted communication tunnel securely connects DPS 100 to remote server 180 and provides end-to-end encryption verification. After the encrypted communication tunnel is established, remote server 180 receives the request from DPS 100 via the encrypted communication tunnel. DPS 100 receives remote private information 186 in an encrypted format from remote server 180, via the encrypted communication tunnel. Using VPN client 113, DPS 100 decrypts (if encrypted) and outputs the remote private information 186 on an output device, such as output device 150 of DPS 100.

In at least one embodiment, instead of establishing a VPN, DPS 100 may encrypt the request for private information, and transmit the encrypted request to the network-connected external device (i.e., remote server 180) without an intermediate VPN server being required to facilitate secured routing of the private information from the external device. In such embodiments, DPS 100 can receive remote private information 186 (in an encrypted format) from remote server 180 via network 170. DPS 100 may decrypt (using VPN client 113) the received remote private information 186, and DPS 100 may provide the private information to the user via output device(s) 150.

In instances when privacy detector 194 applies a public flag to the voice input from the authorized user, PSTPDR 190 selects the network-based processing path to process the voice input. Within the network-based processing path, cloud-based ASR engine 184 converts the voice input, to which a public flag is applied, from audio format to text format and generates a text transcription 185 of the voice input. Remote server 180 uses the text transcription 185 to determine which task the user requests remote virtual assistant 198' to perform, and then remote virtual assistant 198' performs the requested task. As an example, a user-requested task could be to retrieve and return public information 188. In performing the user-requested task, remote server 180 (e.g., using remote virtual assistant 198') provides the requested public information 188 to DPS 100 through the network-based processing path. DPS 100 provides (e.g., displays or narrates) the requested public information 188 to the user via output device(s) 150 (e.g., a display or speakers).

In at least one embodiment, storage 120 of DPS 100 stores authorized user ID(s) 122 for each authorized user of DPS 100. An authorized user is a person having a profile and/or authorized user ID 122 that is associated with, or accessed on, the particular DPS 100. For example, an authorized user can be an owner of DPS 100. In some embodiments, DPS 100 can be associated with multiple authorized users, such as owner of DPS 100 and spouse of the owner. That is, authorized user ID(s) 122 can include a separate user ID for the owner of DPS 100 and a separate user ID for the spouse of the owner. In some embodiments, authorized user ID 122 is a voice ID. The voice ID identifies a particular person based upon a voice input from that particular person. Voice authenticator 192 verifies that a voice input belongs to a particular person. Voice authenticator 192 initially registers the voice of an individual person when he or she utters words during a voice ID registration/training session. During the voice ID registration/training session, voice authenticator 192 receives and stores voice characteristics, such as tone, inflection, speed, and other natural language characteristics, as a voice ID associated with the authorized user ID(s) 122. To later identify the individual person as an authorized user or to authenticate voice input from the individual person as being from an authorized user, the individual utters the same or other words to DPS 100. Voice authenticator 192 compares voice characteristics received within the voice input to the known characteristics within the registered voice ID to determine a match. Voice authenticator 192 sets authorized speech indicator 132 to a value of 1 to indicate that the voice input is from an "authorized" user when the comparison results in a match, and voice authenticator 192 sets authorized speech indicator 132 to a value of 0 to indicate that the voice input is from an "unauthorized" user when the comparison does not result in a match. In some embodiments, authorized user ID 122 includes a face ID. The face ID identifies a particular person based upon images within which the face of that particular person is captured (e.g., during a face ID registration/training session). Within authorized user ID(s) 122, a particular person may be associated with multiple identifiers, such as a voice ID, face ID, fingerprint ID, and pattern code.

When voice authenticator 192 determines that the voice input contains speech from an unauthorized user, PSTPDR 190 selects the network-based processing path to process the voice input using a network-connected external device. Within the network-based processing path, cloud-based ASR engine 184, in response to detecting that authorized speech indicator 132 is set to a value of 0 indicating that the voice input is from an unauthorized user, converts the voice input from audio format to text format and generates a text transcription 185 of the voice input. Remote server 180 uses the text transcription 185 to: (i) determine which task the unauthorized user requests remote virtual assistant 198' to perform; and (ii) perform the requested task. As an example, a user-requested task could be to retrieve and return remote private information 186 or public information 188. In performing the user-requested task, remote server 180 provides the requested remote private information 186 or public information 188 to DPS 100 through the network-based processing path. In many cases, remote servers require any user to provide login credentials in order to access remote private information 186. It is understood that in responding to the request of the unauthorized user, remote server 180 may provide the requested remote private information 186 or public information 188 to DPS 100 through the network-based processing path in an unencrypted or encrypted format. That is, PSTPDR 190 does not require remote server 180 to use an encrypted format in responding (i.e., retrieving and returning remote private information 186 or public information 188) to the request of the unauthorized user.

Figure 2:
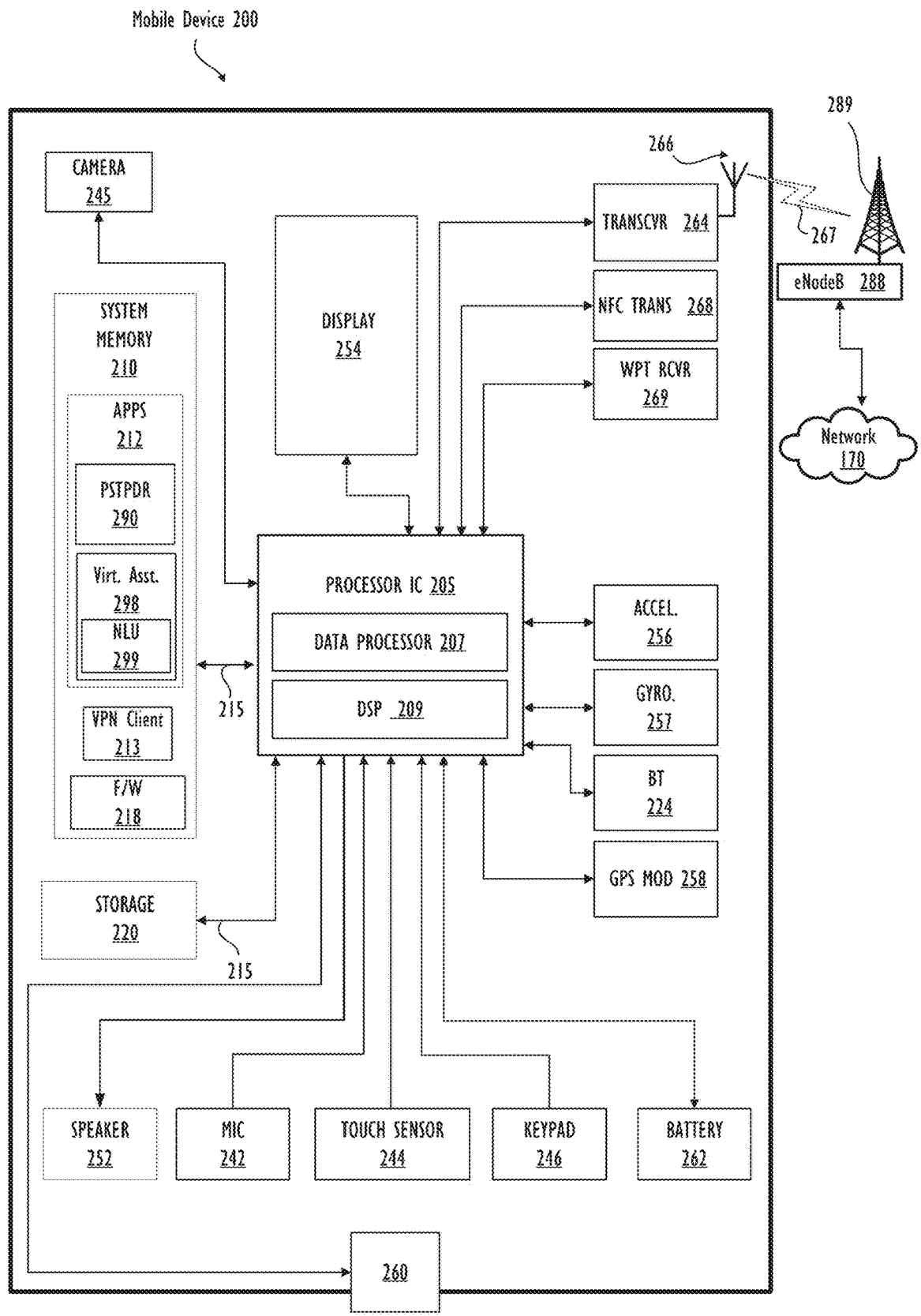
FIG. 2 illustrates a mobile device within which certain aspects of the disclosure can be practiced, in accordance with one or more embodiments of this disclosure.

In the description of the following figures, reference is also occasionally made to specific components illustrated within the preceding figures, utilizing the same reference numbers from the earlier figures. With reference now to FIG. 2, there is illustrated example mobile device 200. Mobile device 200 includes at least one processor integrated circuit, processor IC 205. Included within processor IC 205 are data processor 207 and digital signal processor (DSP) 209. Processor IC 205 is coupled to system memory 210 and non-volatile storage 220 via a system communication mechanism, such as system interconnect 215. System interconnect 215 can be interchangeably referred to as a system bus, in one or more embodiments. One or more software and/or firmware modules can be loaded into system memory 210 during operation of mobile device 200. Specifically, in one embodiment, system memory 210 can include therein a plurality of such modules, including firmware (F/W) 218. System memory 210 may also include basic input/output system and an operating system (not shown). The software and/or firmware modules provide varying functionality when their corresponding program code is executed by processor IC 205 or by secondary processing devices within mobile device 200.

Processor IC 205 supports connection by and processing of signals from one or more connected input devices such as microphone 242, touch sensor 244, camera 245, and keypad 246. Processor IC 205 also supports connection by and processing of signals to one or more connected output devices, such as speaker 252 and display 254. Additionally, in one or more embodiments, one or more device interfaces 260, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 262 that supplies power to mobile device 200.

Mobile device 200 further includes Bluetooth transceiver 224 (illustrated as BT), accelerometer 256, global positioning system module (GPS MOD) 258, and gyroscope 257, all of which are communicatively coupled to processor IC 205. Bluetooth transceiver 224 enables mobile device 200 and/or components within mobile device 200 to communicate and/or interface with other devices, services, and components that are located external to mobile device 200. GPS MOD 258 enables mobile device 200 to communicate and/or interface with other devices, services, and components to send and/or receive geographic position information. Gyroscope 257 communicates the angular position of mobile device 200 using gravity to help determine orientation. Accelerometer 256 is utilized to measure non-gravitational acceleration and enables processor IC 205 to determine velocity and other measurements associated with the quantified physical movement of a user.

Mobile device 200 is presented as a wireless communication device. As a wireless device, mobile device 200 can transmit data over wireless network 170. Mobile device 200 includes transceiver 264, which is communicatively coupled to processor IC 205 and to antenna 266. Transceiver 264 allows for wide-area or local wireless communication, via wireless signal 267, between mobile device 200 and evolved node B (eNodeB) 288, which includes antenna 289. Mobile device 200 is capable of wide-area or local wireless communication with other mobile wireless devices or with eNodeB 288 as a part of a wireless communication network. Mobile device 200 communicates with other mobile wireless devices by utilizing a communication path involving transceiver 264, antenna 266, wireless signal 267, antenna 289, and eNodeB 288. Mobile device 200 additionally includes near field communication transceiver (NFC TRANS) 268 wireless power transfer receiver (WPT RCVR) 269. In one embodiment, other devices within mobile device 200 utilize antenna 266 to send and/or receive signals in the form of radio waves. For example, GPS module 258 can be communicatively couple to antenna 266 to send/and receive location data.

As provided by FIG. 2, mobile device 200 additionally includes PSTPDR module 290 (hereinafter "PSTPDR" 290). PSTPDR 290 may be provided as an application that is optionally located within the system memory 210 and executed by processor IC 205. Within this embodiment, processor IC 205 executes PSTPDR 290 to provide the various methods and functions described herein. In order to provide seclusion, PSTPDR 290 enables mobile device 200 to perform the functions of routing audio voice input to a cloud-based ASR engine (e.g., cloud-based ASR 184 of FIG. 1) or to a local ASR engine (e.g., within PSTPDR 290, or local ASR engine 196 of FIG. 1), based on speech content and identification of a user as being an authorized user or an unauthorized user, in accordance with one or more embodiments of this disclosure. In at least one embodiment, PSTPDR 290 may be a component of, may be combined with, or may be incorporated within one or more applications 212.

Although two PSTPDR modules 190 of FIG. 1 and 290 of FIG. 2 are shown, it is understood that PSTPDR 290, VPN client module 213, NLU 299, and virtual assistant 298 (illustrated as Virt. Asst.) of FIG. 2 can have the same or similar configuration as respective components PSTPDR 190, VPN client module 113, NLU 199, and virtual assistant 198 of FIG. 1, and can perform the same or similar operations or functions as PSTPDR 190, VPN client module 113, and virtual assistant 198 of FIG. 1. As an example, PSTPDR 290 of FIG. 2 could include components such as a voice authenticator 192, a privacy detector 194, and a local ASR engine 196 shown in FIG. 1. In is also understood that mobile device 200 of FIG. 2 can also have the same or similar configuration as DPS 100. For example, storage 220 of FIG. 2 could include components such as authorized user ID 122, private information 124, and binary classifier model 128, which are shown in FIG. 1. Similarly, DPS 100 of FIG. 1 could include components shown in FIG. 2.

With reference now to FIG. 3, there is illustrated components of the data processing system of FIG. 1 processing an example voice input through a local processing path within DPS 100, in accordance with one or more embodiments. In the illustrated embodiment, user 302 speaks aloud to DPS 100 using speech 310 (i.e., "My new phone number is 555-555-555.") to request virtual assistant 198 to perform a task. Speech 310 refers to words spoken by user 302, which can be in natural language. The voice of user 302 provides speech 310 which generates soundwaves 303 which are received by microphone 142. Microphone 142 transduces the received soundwaves 303 into an electrical signal herein referred to as voice input 304 and provides voice input 304 to voice authenticator 192 within PSTPDR 190. Voice authenticator 192 determines whether voice input 304 is from an authorized user. That is, voice authenticator 192 compares voice characteristics received within voice input 304 to the known voice characteristics within registered voice ID(s) associated with authorized user ID 122 to determine a match. When the comparison yields a match, voice authenticator 192 determines voice input 304 contains speech from an authorized user, and sets authorized speech indicator 132 to a value of 1 to indicate that voice input 304 is from the authorized user. In the embodiment shown in FIG. 3, voice authenticator 192 generates an output signal 306 by embedding the value of authorized speech indicator 132, shown in FIG. 3 as embedded authorized speech indicator 332. Voice authenticator 192 provides output signal 306 containing embedded authorized speech indicator 332, to privacy detector 194, which enables privacy detector 194 to detect that voice input 304 contains speech 310 from an authorized user. For simplicity, output signal 306 is illustrated as containing voice input 304, but it is understood various components of DPS 100 may obtain voice input 304 in a variety of ways. For example, voice authenticator 192 may include voice input 304 within output signal 306 for forwarding to voice authenticator 192, or alternatively, DPS 100 may buffer (i.e., temporarily store within storage 120) voice input 304 for being accessed by the various components of DPS 100 (e.g., PSTPDR 190, local ASR engine 196, VPN client 113, NID 165) that process voice input 304.

Privacy detector 194 determines whether voice input 304 contains private speech. Privacy detector 194 performs feature extraction processes on the waveform of voice input 304, loads the extracted features 129 into the binary classifier model 128, and then runs the feature-loaded binary classifier model 128. Privacy detector 194 uses the classifier result to determine whether the voice input 304 is public speech or private speech. As shown in the example in FIG. 3, in response to determining voice input 304 contains private speech from an authorized user: privacy detector 194 sets private speech indicator 134 (FIG. 1) to a value of 1 to indicate voice input 304 contains private speech; and PSTPDR 190 selects a local processing path for processing voice input 304. In the embodiment shown in FIG. 3, privacy detector 194, in response to determining voice input 304 contains private speech from an authorized user, generates an output signal 308 by embedding the value of private speech indicator 134 (FIG. 1), shown in FIG. 3 as embedded private speech indicator 334. Embedded private speech indicator 334 may be referred to as simply private flag/indicator 334. For simplicity, output signal 308 is illustrated as containing voice input 304, but it is understood various components of DPS 100 may obtain voice input 304 in a variety of ways.

Within the local processing path, in response to receiving private flag/indicator 334, local ASR engine 196 generates a text transcription 197 (i.e., "My new phone number is 555-555-555.") of the speech 310 contained within voice input 304. In generating text transcription 197, local ASR engine 196 converts voice input 304 from audio format to text format. The converted text is then forwarded by local ASR engine 196 to virtual assistant 198.

Virtual assistant 198 determines whether text transcription 197 contains a request for private information, which could be private information 124 that is locally stored within DPS 100 or remote private information 186 located within or accessed via remote server 180 (FIG. 1). More particularly, virtual assistant 198 uses NLU 199 to obtain user intent based on text transcription 197. Within virtual assistant 198, NLU 199 receives text transcription 197 from local ASR engine 196 and performs natural language processing on text transcription 197. Virtual assistant 198 determines that the user intent includes a user-requested task of updating a phone number 314 associated with authorized user 302. Virtual assistant 198 determines that text transcription 197 contains a request for private information by recognizing the phrase "phone number" within text transcription 197 matches the phrase "phone number" within the predefined set of words associated with private speech (e.g., stored in private keyword pool 126).

Virtual assistant 198 performs the user-requested task(s) based on user intent obtained from NLU 199. For example, virtual assistant 198 searches within storage 120 for an existing phone number associated with authorized user 302. Upon finding the phone number 314 within private information 124, virtual assistant 198 updates the phone number 314 associated with authorized user 302 with the new phone number (e.g., "555-555-5555") obtained from text transcription 197. In completing the user-requested task(s), virtual assistant 198 generates a response 316 that informs authorized user 302 that user-requested task(s) have been performed. For example, response 316 could be a visual and/or auditory message stating "Your contacts have been updated to include 555-555-5555 as your new phone number." Virtual assistant 198 provides response 316 to output device (s) 150 for visual display or auditory playback.

With reference now to FIG. 4, there is illustrated an example of remote processing of a voice input through a network-based processing path using a network-connected external device, in accordance with one or more embodiments. User 302 (of FIGS. 3 and 4) speaks aloud to DPS 100 to request virtual assistant 198 to perform a task. Microphone 142 receives and converts soundwaves 403 from the voice of user 302 into an electrical signal herein referred to as voice input 404.

Voice authenticator 192 within PSTPDR 190 receives voice input 404 containing speech 410 from microphone 142. In the example shown in FIG. 4, user 302 is an authorized user, who has previously taken steps to register a voice ID of corresponding to user 302 as part of the authorized user ID 122. Voice authenticator 192 compares voice characteristics received within voice input 404 to the known voice characteristics within registered voice ID(s) associated with authorized user ID 122 and determines a match. When the comparison yields a match, voice authenticator 192 determines voice input 404 contains speech from an authorized user, and sets authorized speech indicator 132 to a value of 1 to indicate that voice input 404 is from the authorized user. Voice authenticator 192 generates an output signal 406 by embedding the value of authorized speech indicator 132, shown in FIG. 4 as embedded authorized speech indicator 332. Voice authenticator 192 provides output signal 406, containing embedded authorized speech indicator 432, to privacy detector 194, indicating that voice input 404 contains speech from an authorized user. For simplicity, output signal 406 is illustrated as containing voice input 404, but it is understood various components of DPS 100 may obtain voice input 404 in a variety of ways.

Privacy detector 194 performs feature extraction processes on the waveform of voice input 404, loads the extracted features 129 into the binary classifier model 128, and then runs the feature-loaded binary classifier model 128. As shown in the example in FIG. 4, in response to determining voice input 404 contains private speech from an authorized user, privacy detector 194 sets private speech indicator 134 (FIG. 1) to a value of 1 to indicate voice input 404 contains private speech, and PSTPDR 190 selects a local processing path for processing voice input 404. In the embodiment shown in FIG. 4, privacy detector 194, in response to determining voice input 404 contains private speech from an authorized user, generates an output signal 408 by embedding the value of private speech indicator 134 (FIG. 1), shown in FIG. 4 as embedded private speech indicator 434. Embedded private speech indicator 434 may be referred to as simply private flag/indicator 434. For simplicity, output signal 408 is illustrated as containing voice input 404, but it is understood various components of DPS 100 may obtain voice input 404 in a variety of ways.

Within the local processing path, in response to receiving a private flag/indicator 434, local ASR engine 196 generates a text transcription 197 (i.e., "What is my bank account number?") of the speech 410 contained within voice input 404. In a similar manner as described above with reference to FIG. 3, virtual assistant 198 determines whether text transcription 197 contains a request for or reference to private information, which could be private information 124 stored locally within DPS 100 or remote private information 186 stored within or accessed via remote server 180. Within virtual assistant 198, NLU 199 performs natural language processing on text transcription 197. NLU 199 determines that the user intent includes a user-requested task of retrieving bank account number 414 associated with authorized user 302. Virtual assistant 198 determines text transcription 197 contains a request for private information by recognizing the phrase "bank account number" within text transcription 197 matches the phrase "bank account number" within the predefined set of words associated with private speech (e.g., stored in private keyword pool 126).

Virtual assistant 198 performs the user-requested task(s) based on the user intent obtained from NLU 199. For example, virtual assistant 198 searches within storage 120 for bank account number associated with authorized user 302. In response to virtual assistant 198 failing to find the bank account number 414 within locally stored, private information 124, virtual assistant 198 generates and/or issues a request 415 to PSTPDR 190 to retrieve the private information from remote server 180.

PSTPDR 190 establishes an encrypted communication tunnel 416 between DPS 100 and remote server 180 using VPN client module 113 and NID 165.

After the encrypted communication tunnel 416 is established, PSTPDR 190 sends an encrypted request 418 to retrieve bank account number 414 from remote server 180. That is, DPS 100 encrypts request 418 according to the VPN protocol of encrypted communication tunnel 416. NID 165 transmits encrypted request 418 to remote server 180 via encrypted communication tunnel 416, which routes and carries electronic communications traffic through network 170.

Within remote server 180, VPN client 182 decrypts or otherwise decodes encrypted request 418. Once decoding is complete, VPN client 182 enables other modules within remote server 180 to process the decrypted request. Remote server 180 generates a response 420a based on decrypted request. Response 420a includes bank account number 414 corresponding to encrypted request 418 when the account number is identified at remote server 180. Remote server 180 transmits response 420 to DPS 100 via network 170. More particularly, within remote server 180, VPN client 182 encrypts or otherwise encodes response 420a according to the VPN protocol of encrypted communication tunnel 416. Once encoding is complete, VPN client 182 transmits encrypted response 420a to DPS 100 via encrypted communication tunnel 416.

DPS 100 receives encrypted response 420a at NID 165, which forwards the encrypted response 420a to VPN client 113. Within DPS 100, VPN client 113 decrypts the received encrypted response 420a and forwards the decrypted response 420b to virtual assistant 198. Virtual assistant 198 then uses the decrypted response 420b to complete the user-requested task of obtaining bank account number 414. Virtual assistant 198 provides bank account number 414 to output device(s) 150 for visual display or auditory playback.

Figure 5A:
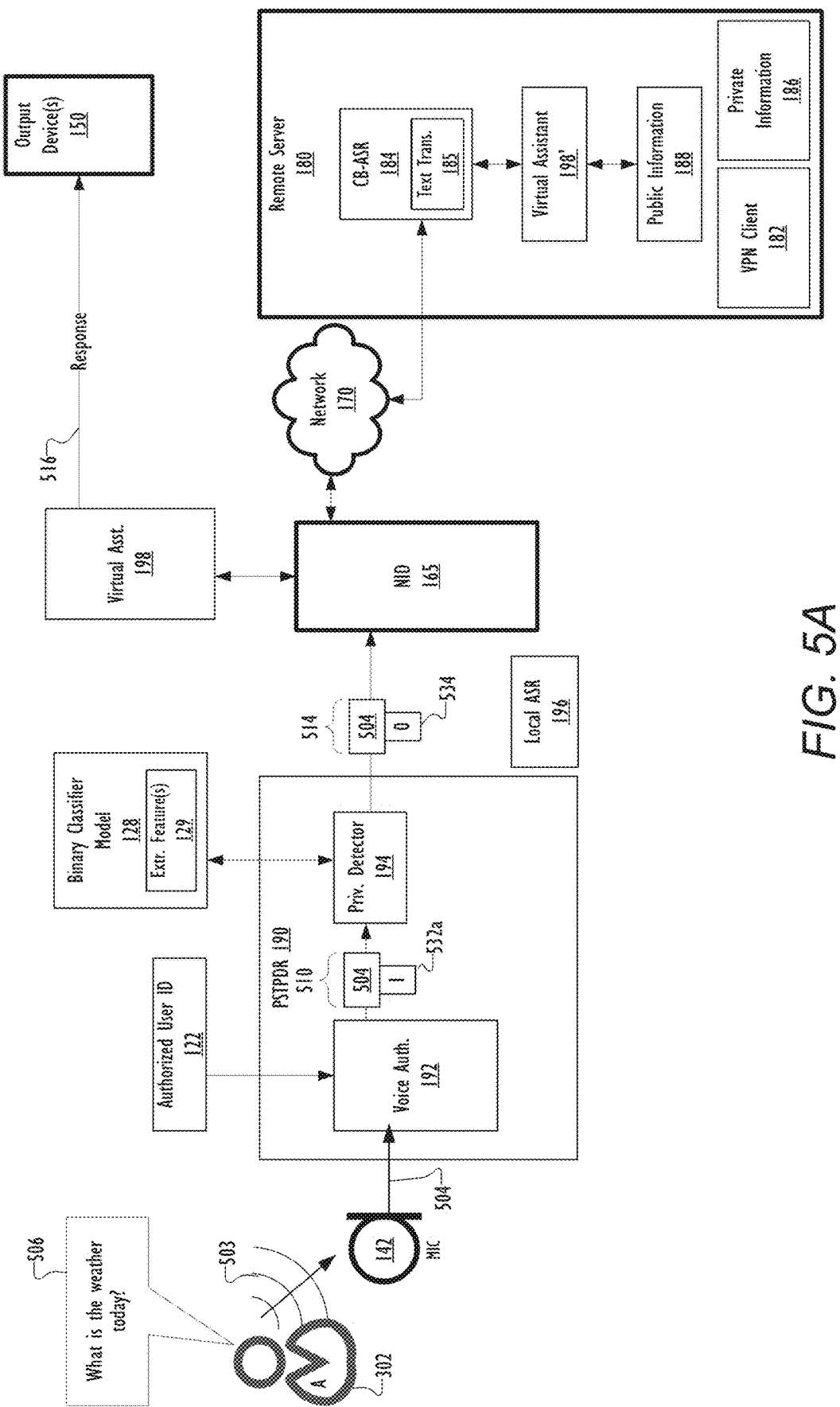
FIGS. 5A and 5B illustrates two examples of voice inputs that trigger remote processing through a network-based processing path using a network-connected external device, in accordance with one or more embodiments.
Figure 5B:
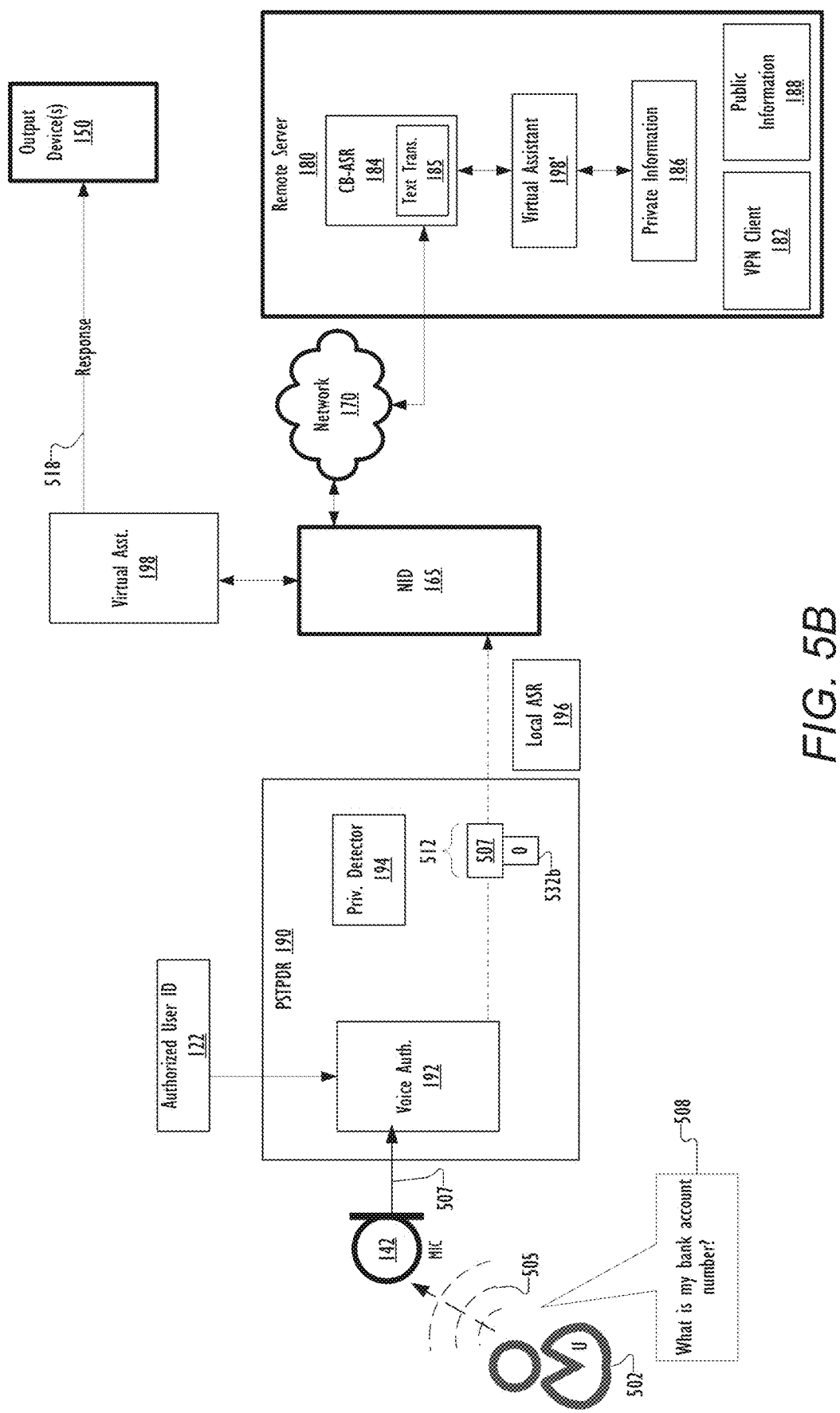

With reference now to FIGS. 5A and 5B, there are illustrated two examples of voice inputs that trigger remote processing through a network-based processing path using a network-connected external device, in accordance with embodiments of the disclosure. With reference now to FIG. 5A, voice input 504 is generated from soundwaves 503 corresponding to public speech 506 from an authorized first user 302. Authorized user 302 speaks aloud to DPS 100 to request virtual assistant 198 to perform a task. The voice of authorized user 302 generates soundwaves 503 that are received by microphone 142. Microphone 142 receives and converts soundwaves from authorized user 302 (who is speaking to DPS 100 to voice input 504.

Voice authenticator 192 within PSTPDR 190 receives voice input 504 from microphone 142. To determine whether voice input 504 is from an authorized user, voice authenticator 192 compares voice characteristics received within voice input 504 to the known voice characteristics within registered voice ID(s) associated with authorized user ID 122. When the comparison within voice authenticator 192 yields a match, voice authenticator 192 determines voice input 504 contains speech from an authorized user, sets authorized speech indicator 132 to a value of 1 to indicate that voice input 504 is from the authorized user. Voice authenticator 192 generates an output signal 510 by embedding the value of authorized speech indicator 132, shown in FIG. 5A as embedded authorized speech indicator 532a. Voice authenticator 192 provides authorized speech indicator 532a to privacy detector 194, indicating that voice input 504 contains speech from an authorized user. For simplicity, output signal 510 is illustrated as containing voice input 504, but it is understood various components of DPS 100 may obtain voice input 504 in a variety of ways.

With the voice input identified as being from authorized user 302, privacy detector 194 performs the feature extraction processes provided in FIGS. 3 and 4. In response to determining voice input 504 does not contain private speech: (i) PSTPDR 190 ascertains that voice input 504 from authorized user 302 contains public speech; (ii) privacy detector 194 applies a public flag/indicator 534 to voice input 504; and (iii) PSTPDR 190 selects a network-based processing path for processing voice input 504. In response to determining voice input 504 does not contain private speech, PSTPDR 190 sets private speech indicator 134 (FIG. 1) to a value of 0 to indicate voice input 504 contains public speech. Privacy detector 194 generates an output signal 514 by embedding the value of private speech indicator 134 (FIG. 1), shown in FIG. 5A as embedded private speech indicator 534. Embedded private speech indicator 534 may be referred to as simply public flag/indicator 534. For simplicity, output signal 514 is illustrated as containing voice input 504, but it is understood various components of DPS 100 may obtain voice input 504 in a variety of ways. PSTPDR 190 (using privacy detector 194) forwards voice input 504 and public flag/indicator 534 through NID 165 to remote server 180 (which includes cloud-based ASR engine 184) for processing voice input 504 at cloud-based ASR engine 184.

PSTPDR 190 transmits (via NID 165) voice input 504 that contains speech 506 to remote server 180 via network 170. For instance, PSTPDR 190 transmits output signal 514, which contains speech 506 within voice input 504 together with the corresponding public flag/indicator 534, to remote server 180 via network 170. In at least one embodiment, the transmission of the output signal 514 includes a transmission of an indicator that triggers remote server 180 to complete conversion of the received voice input from audio format to text format using cloud-based ASR 184. For example, in response to receiving output signal 514 that contains speech 506 within voice input 504, cloud-based ASR 184 generates text transcription 185 (i.e., "What is the weather today?" as shown in speech 506 in FIG. 5A).

In one embodiment, remote server 180 then returns the text transcription 185 to DPS 100 for further processing (e.g., performing secondary functions) by virtual assistant 198. In an alternate embodiment, cloud-based ASR 184 provides text transcription 185 to a remote virtual assistant 198' at remote server 180, which performs secondary functions based on text transcription 185.

In performance of the secondary functions, the virtual assistant 198, 198' may determine the intent of the user based on text transcription 185 and perform user-requested task(s) based on the determined user intent. The determined user intent may be to retrieve remote private information 186 or public information 188. For example, remote server 180 may retrieve public information 188 (such as weather temperature, cloud conditions, and precipitation levels) when text transcription 185 (i.e., "What is the weather today?") corresponds to speech 506. That is, the virtual assistant 198, 198' obtains public information 188 from remote server 180.

In performance of the secondary functions, the virtual assistant 198, 198' generates a response 516 based on text transcription 185 and the public information 188 received from remote server 180. Response 516 can be an answer to a question(s) within speech 506. When remote virtual assistant 198' generates response 516, remote server 180 forwards response 516 via network 170 to virtual assistant 198. In both cases of response 516 being generated by remote virtual assistant 198' or by virtual assistant 198, within DPS 100, virtual assistant 198 provides response 516 to output device(s) 150 for visual display or auditory playback. As an example, with output signal 514 that contains speech 506 within voice input 504, response 516 could include public information 188 presented as a visual and/or auditory message stating "Today's weather is partly cloudy conditions with a 10% chance of rain with a high of 84° F. and a low of 64° F."

In FIG. 5B, voice input 507 is generated from soundwaves 505 corresponding to private speech 508 from an unauthorized second user 502. Unauthorized user 502 speaks aloud to DPS 100 to request a virtual assistant (e.g., voice assistant 198 or remote voice assistant 198') to perform a task. The voice of unauthorized user 502 generates soundwaves 505 that are received by microphone 142. Microphone 142 receives and converts soundwaves from the unauthorized user 502 (who is speaking to DPS 100) to voice input 507.

Voice authenticator 192 within PSTPDR 190 receives voice input 507 from microphone 142. To determine whether voice input 507 is from an authorized user, voice authenticator 192 compares voice characteristics received within voice input 504 to the known voice characteristics within registered voice ID(s) associated with authorized user ID 122. When the comparison within voice authenticator 192 yields no match, as with voice input received from unauthorized user 502, voice authenticator 192 determines voice input 507 contains speech from an unauthorized user. Voice authenticator 192 sets authorized speech indicator 132 to a value of 0 to indicate that voice input 507 is from the unauthorized user. In the embodiment shown in FIG. 5B, voice authenticator 192 generates an output signal 512 by embedding the value of authorized speech indicator 132, shown in FIG. 5B as embedded authorized speech indicator 532b. Voice authenticator 192, in response to determining voice input 507 contains speech from an unauthorized user, uses NID 165 to provide embedded authorized speech indicator 532b to remote virtual assistant 198', indicating that voice input 507 contains speech from an unauthorized user. For simplicity, output signal 512 is illustrated as containing voice input 507, but it is understood various components of DPS 100 may obtain voice input 507 in a variety of ways.

PSTPDR 190 transmits (via NID 165) voice input 507 that contains speech 508 to remote server 180 via network 170. For instance, PSTPDR 190 transmits output signal 512, which contains speech 508 within voice input 504 together with the corresponding embedded authorized speech indicator 532b, to remote server 180 via network 170. In at least one embodiment, the transmission of the output signal 512 includes a transmission of an indicator that triggers remote server 180 to complete conversion of the received voice input from audio format to text format using cloud-based ASR 184. For example, in response to receiving output signal 512 that contains speech 508 within voice input 504, cloud-based ASR 184 generates text transcription 185 (i.e., "What is my bank account number?" as shown in speech 508 in FIG. 5B).

In one embodiment, remote server 180 then returns the text transcription 185 to DPS 100 for further processing (e.g., performing secondary functions) by virtual assistant 198. In an alternate embodiment, cloud-based ASR 184 provides text transcription 185 to a remote virtual assistant 198' at remote server 180, which performs secondary functions based on text transcription 185.

In performance of the secondary functions, the virtual assistant 198, 198' may determine the intent of the user based on text transcription 185 and perform user-requested task(s) based on the determined user intent. The determined user intent may be to retrieve remote private information 186 or public information 188. As an example, remote server 180 may retrieve remote private information 186 (such as bank account number 414 of FIG. 4) when text transcription 185 (i.e., "What is my bank account number?") corresponds to speech 508. That is, the virtual assistant 198, 198' obtains remote private information 186 from remote server 180. In some instances, remote server 180, before allowing remote private information 186 to be obtained, may require unauthorized user 502 to provide additional user input such as a pre-registered username, password, multi-factor authentication code, and/or other login credentials.

In performance of the secondary functions, the virtual assistant 198, 198' generates a response 518 based on text transcription 185 and the remote private information 186 received from remote server 180. Response 518 can be an answer to a question(s) within speech 508. When remote virtual assistant 198' generates response 518, remote server 180 forwards response 518 via network 170 to virtual assistant 198. In both cases of response 518 being generated by remote virtual assistant 198' or by virtual assistant 198, within DPS 100, virtual assistant 198 provides response 518 to output device(s) 150 for visual display or auditory playback. With the output signal 512 that contains speech 508 within voice input 507, response 518 could include bank account number 414 (FIG. 4) as remote private information 186 and could be presented as a visual and/or auditory message stating "Your bank account number is XXX-XXX."

Figure 6:
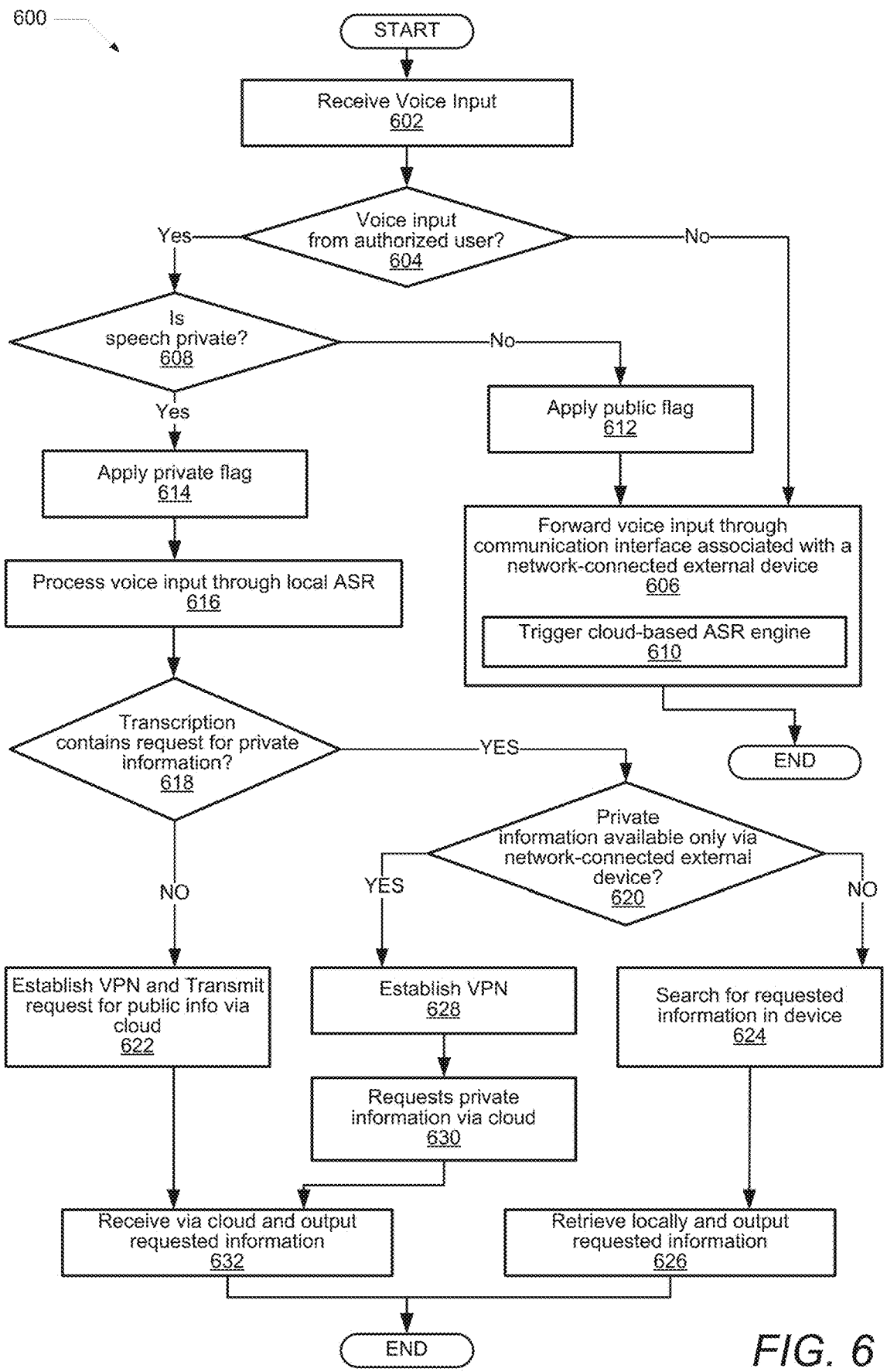
FIG. 6 is a flow chart illustrating a method for operating a private speech transcription and private data retrieval (PSTPDR) module that routes audio to a selected one of cloud-based ASR engine or local ASR engine based on user ID and speech content to provide privacy, in accordance with one or more embodiments.

With reference now to FIG. 6, there is illustrated an example method 600 for operating a private speech transcription and private data retrieval (PSTPDR) module that routes audio to a selected one of cloud-based ASR engine or local ASR engine based on user ID and speech content, to provide privacy. The functions presented within method 600 are achieved by processor execution of PSTPDR module within DPS 100 or mobile device 200, in accordance with one or more embodiments. The description of method 600 will be described with reference to the components and examples of FIGS. 1-5. Several of the processes of the method provided in FIG. 6 can be implemented by one or more processors (e.g., processor(s) 105 or processor IC 205) executing software code of PSTPDR 190 or 290 within a data processing system (e.g., DPS 100 or mobile device 200). The method processes described in FIG. 6 are generally described as being performed by processor 105 of DPS 100 executing PSTPDR module 190, which execution involves the use of other components of DPS 100.

Method 600 begins at the start block, then proceeds to block 602. At block 602, processor 105 receives a voice input from a user of DPS 100. At block 604 of the method, processor 105 determines whether the voice input is from an authorized user. That is, processor 105 determines whether the voice input contains speech from the authorized user. For example, as shown in FIG. 1, voice authenticator 192 performs voice authentication processes on the voice input to determine whether the voice input is from an authorized user or an unauthorized user. In response to determining the voice input is from an unauthorized user, the method proceeds to block 606. In response to determining the voice input is from an authorized user, the method proceeds to block 608. At block 606, processor 105 forwards the voice input through a communication interface associated with a network-connected external device (e.g., cloud-based ASR engine 184) in order to process the voice input at the network-connected external device. It is appreciated that the forwarding of the voice input to the network connected external device can be in response to determining either (i) that the speech does not contain private speech from an authorized user or (ii) in response to determining that the voice input is from an unauthorized user. For example, as shown in FIG. 5B, DPS 100 forwards the output signal 512 via NID 165 to remote server 180. Output signal 512 includes voice input 507 and embedded authorized speech indicator 532b indicating that the voice input contains speech from an unauthorized user. As another example, as shown in FIG. 5A, DPS 100 forwards output signal 514 (i.e., containing speech 506 within voice input 504) via NID 165 to remote server 180, and output signal 514 includes public flag/indicator 534 indicating that the voice input contains public speech from an authorized user.

According to one aspect of the disclosure, forwarding (at block 606) the voice input to the network-connected external device further comprises triggering (at block 610) the network-connected external device to complete conversion of the voice input from audio format to text format using a cloud-based ASR engine. Remote server 180 processes the voice input by not only receiving the forwarded voice input, but also recognizing a trigger to perform audio-to-text conversion on the voice input. For example, as shown in FIG. 5A, the transmission of the output signal 514 (i.e., containing voice input 504) can include transmission of corresponding indicator 534 as an indicator that triggers remote server 180 to complete conversion of the received voice input from audio format to text format using cloud-based ASR 184. As a similar example, as shown in FIG. 5B, the transmission of the output signal 512 (i.e., containing voice input 507) can include transmission of corresponding indicator 532b as an indicator that triggers remote server 180 to complete conversion of the received voice input from audio format to text format using cloud-based ASR 184 At remote server 180, processing the output signal 514 (i.e., containing speech 506 within voice input 504) or processing the output signal 512 (i.e., containing speech 508 within voice input 504) includes using cloud-based ASR engine 184 to convert the voice input from audio format to text format and generate text transcription 185. The process 600 concludes at the end block.

At block 608 of the method, processor 105 determines whether the voice input contains private speech or public speech. In response to determining the voice input does not contain private speech from the authorized user, processor 105 ascertains that the voice input from the authorized user contains public speech, and processor 105 applies a public flag (e.g., public flag/indicator 534 of FIG. 5A) to the voice input (block 612). For example, as shown in FIG. 5A, privacy detector 134 sets private speech indicator 132 (FIG. 1) to a value of 0 to indicate that voice input 504 (i.e., containing speech 506) contains public speech. Method 600 proceeds to block 606. In response to determining the voice input contains private speech from an authorized user, processor 105 applies a private flag (e.g., private speech indicator 332 of FIG. 3 or private speech indicator 432 of FIG. 4) to the voice input (block 614), and the method proceeds to block 616. For example, as shown in FIGS. 3 and 4, privacy detector 134 sets private speech indicator 132 (FIG. 1) to a value of 1 to indicate that voice input 304, 404 contains private speech.

At block 616, processor 105 processes the voice input, which contains private speech from an authorized user, through a local ASR engine 196 within the DPS 100. In processing the voice input, the local ASR engine 196 within the DPS 100 converts the private speech from audio format to text format and outputs a text transcription 197 of the private speech. At block 618, processor 105 determines whether the text transcription 197 contains a request for private information. In response to determining text transcription 197 contains a request for private information, the method proceeds to block 620. In response to determining text transcription 197 does not contain a request for private information, the method proceeds to block 622.

At block 620, processor 105 determines whether the user-requested private information is available only via the network-connected external device (i.e., remote server 180). In response to determining user-requested private information 124 is available within mobile device 200, the method proceeds to searching for the requested content within mobile device 200 (block 624). In response to determining user-requested remote private information 186 is only available via the network-connected external device, the method proceeds to block 628. At block 626, processor 105 retrieves the requested private information 124 within DPS 100, and processor 105 completes the user-requested task(s) by outputting the requested information 124 to output device(s) 150. For example, processor 105 generates a response 316 (FIG. 3) that includes the requested information 124 and informs authorized user 302 that user-requested task(s) have been performed. In one embodiment, processor 105 provides response 316 to output device(s) 150 for visual display or auditory playback.

At block 628, processor 105 establishes a virtual private network (VPN) through which to transmit the request for private information to the network-connected external device in order to securely receive the remote private information 186 from the external device. For example, as shown in FIG. 4, PSTPDR 190 uses VPN client module 113 to establish an encrypted communication tunnel 416 to remote server 180.

At block 630, processor 105 transmits the request for remote private information 186 via the network-based processing path. In one embodiment, in order to securely receive the private information from the external device, processor 105 encrypts and transmits the request 418 (FIG. 4) for remote private information 186 via the encrypted communication tunnel to remote server 180.

In one embodiment, when processor 105 determines that the voice input contains private speech, any user-requested information (whether private information or public information) will be retrieved via VPN. At block 622, processor 105 establishes a VPN in a similar manner as in block 628, and processor 105 transmits the request for public information 188 via the network-based processing path in a similar manner as the request for private information in block 630. That is, once private speech from an authorized user is detected within the voice input, in order to securely receive the public information 188 from the external device, processor 105 transmits the request for public information via the encrypted communication tunnel to remote server 180.

At block 632, processor 105 receives the requested remote private information 186, 414 within an encrypted response 420a from the network-connected external device, and processor 105 completes the user-requested task by outputting the requested information 186, 414 to output device(s) 150. That is, processor 105 decrypts the received encrypted response 420a (FIG. 4), obtains the requested information 414, and informs authorized user 302 that user-requested task(s) have been performed. For example, as shown in FIG. 4, processor 105 provides the requested information 414 to output device(s) 150 for visual display or auditory playback. The process 600 concludes at the end block.

In the above-described flowchart of FIG. 6, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
receiving a voice input via a microphone of an electronic device;
determining whether the voice input contains speech from an authorized user of the electronic device or speech from an unauthorized user;
in response to determining that the voice input contains speech from the authorized user:
determining whether the speech contains private speech or public speech;
in response to determining that the speech contains private speech, processing the voice input through a local automatic speech recognition (ASR) engine within the electronic device, the local ASR engine converting the voice input from audio format to text format and outputting a text transcription of the private speech; and
in response to determining that the speech does not contain private speech, forwarding the voice input through a communication interface associated with a network-connected external device for processing the voice input at the network-connected external device.

2. The method of claim 1, further comprising:
in response to determining that the voice input contains speech from the unauthorized user, forwarding the voice input through the communication interface associated with the network-connected external device for processing the voice input at the network-connected external device.

3. The method of claim 1, further comprising:
determining whether the speech contains private speech or public speech by using a binary classifier within the electronic device that analyzes a waveform of the voice input to detect private speech and applies one of a private flag or a not-private flag to the voice input based on results of the analysis.

4. The method of claim 1, wherein:
forwarding the voice input to the network connected external device, in response to determining that the speech does not contain private speech, comprises triggering the network-connected external device to complete conversion of the voice input from audio format to text format using a cloud-based ASR engine.

5. The method of claim 1, further comprising:
analyzing the text transcription from the local ASR engine to determine whether the text transcription contains a request for private information;
in response to determining that the text transcription contains a request for private information, determining whether the private information is available only via the network-connected external device; and
in response to determining that the private information is available only via the network-connected external device, establishing a virtual private network (VPN) through which to transmit the request for private information to the network-connected external device in order to securely receive the private information from the external device.

6. An electronic device comprising:
at least one microphone that receives a voice input;
an output device;
a communication interface that enables communication, via a network, to a network-connected external device;
a memory storing a private speech transcription and private data retrieval (PSTPDR) module that configures the electronic device to process the voice input through a selected one of a local processing path within the electronic device and a network-based processing path using a network-connected external device, in part based on whether the voice input contains speech from an authorized user or speech from an unauthorized user; and
a processor coupled to the at least one microphone, the communication interface, the memory, and the output device, and which executes the PSTPDR module that enables the electronic device to:
determine whether the voice input contains speech from the authorized user of the electronic device; and
in response to determining that the voice input contains speech from the authorized user:
determine whether the speech contains private speech or public speech; and
in response to determining that the speech contains private speech, process the voice input through a local automatic speech recognition (ASR) engine, the local ASR converting the voice input from audio format to text format and outputting a text transcription of the private speech; and
in response to determining that the speech does not contain private speech, forward the voice input through the communication interface associated with the network-connected external device for processing the voice input at the network-connected external device.

7. The electronic device of claim 6, wherein the private speech transcription and private data retrieval module further enables the electronic device to:
in response to determining that the voice input contains speech from the unauthorized user, forward the voice input through the communication interface associated with the network connected external device for processing the voice input at the network-connected external device.

8. The electronic device of claim 6, wherein:
to determine whether the speech contains private speech or public speech, the processor executes the speech recognition module to use a binary classifier within the electronic device that analyzes a waveform of the voice input to detect private speech and applies one of a private flag or a not-private flag to the voice input based on results of the analysis.

9. The electronic device of claim 6, wherein:
forwarding the voice input to the network connected external device, in response to determining that the speech does not contain private speech, comprises triggering the network-connected external device to complete conversion of the voice input from audio format to text format using a cloud-based ASR engine.

10. The electronic device of claim 6, wherein the PSTPDR module further enables the electronic device to:
analyze the text transcription from the local ASR engine to determine whether the text transcription contains a request for private information;
in response to determining that the text transcription contains a request for private information, determine whether the private information is available only via the network-connected external device; and in response to determining that the private information is available only in a network-connected external device, establishing a virtual private network (VPN) through which to transmit the request for private information to the network-connected external device in order to securely receive the private information from the external device.

11. A computer program product comprising:

a non-transitory computer readable storage device;

program code on the computer readable storage device that when executed by a processor associated with an electronic device, the program code enables the electronic device to provide the functionality of:

receiving a voice input via a microphone of the electronic device;

determining whether the voice input contains speech from an authorized user of the electronic device or an unauthorized user;

in response to determining that the voice input contains speech from the authorized user:

determining whether the speech contains private speech or public speech; and in response to determining that the speech contains private speech, processing the voice input through a local automatic speech recognition (ASR) engine within the electronic device, the local ASR engine converting the voice input from audio format to text format and outputting a text transcription of the private speech; and in response to determining that the speech does not contain private speech, forwarding the voice input through a communication interface associated with the network-connected external device for processing the voice input at the network-connected external device.

12. The computer program product of claim 11, wherein the program code further enables the electronic device to provide the functionality of:

in response to determining that the voice input contains speech from an unauthorized user, forwarding the voice input through the communication interface associated with the network-connected external device for processing the voice input at the network-connected external device.

13. The computer program product of claim 11, wherein the program code further enables the electronic device to provide the functionality of:

determining whether the speech contains private speech or public speech by using a binary classifier within the electronic device that analyzes a waveform of the voice input to detect private speech and applies one of a private flag or a not-private flag to the voice input based on results of the analysis.

14. The computer program product of claim 11, wherein:

the program code for forwarding the voice input to the network connected external device, in response to determining that the speech does not contain private speech, comprises computer program code for triggering the network-connected external device to complete conversion of the voice input from audio format to text format using a cloud-based ASR engine.

15. The computer program product of claim 11, wherein the program code further enables the electronic device to provide the functionality of:

analyzing the text transcription from the local ASR engine to determine whether the text transcription contains a request for private information;

in response to determining that the text transcription contains a request for private information, determining whether the private information is available only via the network-connected external device; and in response to determining that the private information is available only in a network-connected external device, establishing a virtual private network (VPN) through which to transmit the request for private information to the network-connected external device in order to securely receive the private information from the external device.

* * * * *